(12) United States Patent
Kamphus et al.

(10) Patent No.: US 12,152,112 B2
(45) Date of Patent: *Nov. 26, 2024

(54) DEGRADATION OF SUPERABSORBENT FIBERS VIA OXIDATIVE DEGRADATION

(71) Applicant: The Procter & Gamble Company, Cincinnati, OH (US)

(72) Inventors: Juliane Kamphus, Schwalbach am Taunus (DE); Bruno Johannes Ehrnsperger, Bad Soden (DE); Arsen Arsenov Simonyan, Schwalbach am Taunus (DE); Natasa Dijakov, Schwalbach am Taunus (DE); Saskia Kraemer, Hessen (DE); Jacqueline Besinaiz Thomas, Oregonia, OH (US); Yiping Sun, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 71 days.

This patent is subject to a terminal disclaimer.

(21) Appl. No.: 17/591,646

(22) Filed: Feb. 3, 2022

(65) Prior Publication Data

US 2022/0267559 A1   Aug. 25, 2022

Related U.S. Application Data

(60) Provisional application No. 63/151,859, filed on Feb. 22, 2021.

(51) Int. Cl.
  *C08J 11/16*   (2006.01)

(52) U.S. Cl.
  CPC ............ *C08J 11/16* (2013.01); *C08J 2333/08* (2013.01)

(58) Field of Classification Search
  USPC ........................................................ 521/40.5
  See application file for complete search history.

(56) References Cited

U.S. PATENT DOCUMENTS

| | | |
|---|---|---|
| 5,244,934 A | 9/1993 | Umeda et al. |
| 5,258,173 A | 11/1993 | Waterfield |
| 5,338,537 A | 8/1994 | White, Jr. |
| 5,618,003 A | 4/1997 | Akiyoshi |
| 6,143,820 A | 11/2000 | Klier |
| 8,383,746 B2 | 2/2013 | Torii |
| 8,517,595 B2 | 8/2013 | Morrison, Jr. |
| 8,952,116 B2 | 2/2015 | Kobayashi |
| 9,095,853 B2 | 8/2015 | Somma |
| 9,156,034 B2 | 10/2015 | Somma |
| 9,822,203 B2 | 11/2017 | Haag |
| 9,850,192 B2 | 12/2017 | Harris et al. |
| 10,881,555 B2 | 1/2021 | Panayotova |
| 11,154,839 B2 | 10/2021 | Collias et al. |
| 11,319,670 B2 | 5/2022 | Konishi |
| 11,525,047 B2 | 12/2022 | Collias et al. |
| 11,649,336 B2 | 5/2023 | Collias et al. |
| 11,746,210 B2 | 9/2023 | Collias et al. |
| 2004/0200138 A1 | 10/2004 | Parish |
| 2009/0003123 A1 | 1/2009 | Morrison, Jr. et al. |
| 2011/0210469 A1 | 9/2011 | Keller |
| 2012/0184670 A1 | 7/2012 | Kobayashi |
| 2013/0172180 A1 | 7/2013 | Naumann |
| 2017/0095792 A1 | 4/2017 | Kim et al. |
| 2017/0166707 A1 | 6/2017 | Jang et al. |
| 2017/0198105 A1 | 7/2017 | Lee et al. |
| 2017/0245443 A1 | 8/2017 | Zhang et al. |
| 2018/0171097 A1 | 6/2018 | Layman et al. |
| 2018/0305518 A1 | 10/2018 | Simonyan et al. |
| 2019/0249029 A1 | 8/2019 | Gibanel |
| 2021/0053028 A1 | 2/2021 | Collias et al. |
| 2021/0054163 A1 | 2/2021 | Collias et al. |
| 2021/0054164 A1 | 2/2021 | Banaszak Holl et al. |
| 2021/0054165 A1 | 2/2021 | Simonyan |
| 2021/0197173 A1 | 7/2021 | Ahn |
| 2021/0388172 A1 | 12/2021 | Collias et al. |
| 2021/0388173 A1 | 12/2021 | Collias et al. |
| 2022/0212165 A1 | 7/2022 | Morita |
| 2022/0266322 A1 | 8/2022 | Kamphus et al. |
| 2023/0167265 A1 | 6/2023 | Simonyan |
| 2023/0366498 A1 | 11/2023 | Nowicki |

FOREIGN PATENT DOCUMENTS

| | | |
|---|---|---|
| CN | 102770251 A | 11/2012 |
| CN | 108822337 A | 11/2018 |
| EP | 1757646 A1 | 2/2007 |
| GB | 1013757 A | 12/1965 |
| JP | H04317784 A | 11/1992 |
| JP | H04317785 A | 11/1992 |
| JP | H06313008 A | 11/1994 |
| JP | H09249711 A | 9/1997 |
| JP | 2001316519 A | 11/2001 |
| JP | 2003321574 A | 11/2003 |

(Continued)

OTHER PUBLICATIONS

Caruso et al. "Mechanically-Induced Chemical Changes inPlymeric Materials", Chemical Reviews, vol. 109, Issue 11, Oct. 14, 2009, pp. 5755-5798.
CM05310Q PCT Search Report and Written Opinion for PCT/US2022/017192 dated Jul. 5, 2022, 10 pages.
Li et al. "Ultraviolet-induced decomposition of acrylic acid based superabsorbent hydrogels crosslinked with N, Nmethylenebisacrylamide", Journal of Applied Polymer Science, vol. 108, Issue 6, Jun. 15, 2008, pp 3435-3441.
Prajapat et al. "Intensification of depolymerization of polyacrylic acid solution using different approaches based on ultrasound and solar irradiation with intensification studies", Ultrasonics Sonochemistry, vol. 32, Issue 6, Sep. 1, 2016, pp. 290-299.
Shukla et al. "Photo, thermal, and ultrasonic degradation of EGDMA-crosslinked poly (acrylic acid-co-sodium acrylate-coacrylamide) superabsorbents", Journal of Applied Polymer Science, vol. 125, Issue 1, Jul. 5, 2012, pp. 630-639.

(Continued)

*Primary Examiner* — Terressa Boykin
(74) *Attorney, Agent, or Firm* — William E. Gallagher; Sarah M. Decristofaro

(57) ABSTRACT

A method for degrading crosslinked superabsorbent fibers (SAF) into soluble polymers is disclosed. Degradation is achieved with an oxidative water-soluble salt comprising at least one cation and at least one anion.

20 Claims, 5 Drawing Sheets

(56) References Cited

FOREIGN PATENT DOCUMENTS

| | | |
|---|---|---|
| JP | 2004317319 A | 11/2004 |
| JP | 2012219038 A | 11/2012 |
| JP | 2019137963 A | 8/2019 |
| WO | 2012140981 A1 | 10/2012 |
| WO | 2019151538 A1 | 8/2019 |
| WO | 2020217757 A1 | 10/2020 |
| WO | 2022081523 A1 | 4/2022 |
| WO | 2022098959 A1 | 5/2022 |

OTHER PUBLICATIONS

All Office Actions; U.S. Appl. No. 17/591,648, filed Feb. 3, 2022.
All Office Actions; U.S. Appl. No. 17/591,650, filed Feb. 3, 2022.
All Office Actions; U.S. Appl. No. 17/591,654, filed Feb. 3, 2022.
U.S. Unpublished U.S. Appl. No. 17/591,648, filed Feb. 3, 2022, to first inventor Juliane Kamphus et. al.
U.S. Unpublished U.S. Appl. No. 17/591,650, filed Feb. 3, 2022, to first inventor Juliane Kamphus et. al.
U.S. Unpublished U.S. Appl. No. 17/591,654, filed Feb. 3, 2022, to first inventor Juliane Kamphus et. al.
All Office Actions, U.S. Appl. No. 17/000,413, filed Aug. 24, 2020.
All Office Actions, U.S. Appl. No. 16/548,873.
All Office Actions, U.S. Appl. No. 16/999,127.
All Office Actions; U.S. Patent Application U.S. Appl. No. 17/341,476, filed on Jun. 8, 2021.
All Office Actions; U.S. Patent Application U.S. Appl. No. 17/341,479, filed on Jun. 8, 2021.
All Ofice Actions; U.S. Patent Application Ser. No. 18/100, 151, filed on Jan. 23, 2023.
Basedow et al., "Ultrasonic Degradation of Polymers in Solution", Advances in Polymer Science, vol. 22, 1977, pp. 83-148.
Caruso et al., "Mechanically-Induced Chemical Changes in Polymeric Materials", Chem. Rev. 2009, vol. 109, pp. 5755-5798.
Dubinsky et al., "Thermal Degradation of poly(acrylic acid) Containing Copper Nitrate", Polymer Degradation and Stability, vol. 86. 2004, pp. 171-178.
Ebrahimi et al., "The Study of Ultrasonic Degradation of Superabsorbent Hydrogels", vol. 2012, Article ID 343768, 06 pages.
Gurkaynak et al., "High-Temperature Degradation of Polyacrylic Acid in Aqueous Solution", Journal of Polymer Science Part A: Polymer Chemistry, vol. 34, 1996, pp. 349-355.
Kaczmarek et al., "Photo-Oxidative Degradation of Some Water-Soluble Polymers in the Presence of Accelerating Agents", Die Angewandte Makromolekulare Chemie 261/262, 1998, pp. 109-121.
Le pine et al., "Thermal Degradation of Polyacrylic Acid in Dilute Aqueous Solution", Polymer Degradation and Stability, vol. 75, 2002, pp. 337-345,.
Li et al., "Ultraviolet-Induced Decomposition of Acrylic Acid-Based Superabsorbent Hydrogels Crosslinked with N,N-Methylenebisacrylamide", Department of Chemistry and Chemical Engineering, Zhongkai University, Guangzhou, CN, Aug. 10. 2007. pp. 3435-3441.
Linden et al., "Photooxidative Degradation of Polymers by HO and HO2 Radicals Generated During the Photolysis of H2O2, FeCl3, and Fenton Reagents", Coordination Chemistry Reviews, 125 (1993) pp. 195-217.
Mcgaugh et al., "The Thermal Degradation of Poly(Acrylic Acid)", Polymer Letters, vol. 5, 1967, pp. 817-820.
Mcneill et al. "Thermal Stability and Degradation Mechanisms of Poly(Acrylic Acid and its Salts: Part 1 - Poly(Acrylic Acid)", Polymer Degradation and Stability, 29 (1990), pp. 233-246.
Mcneill et al., "Thermal Stability and Degradation Mechanisms of Poly(Acrylic Acid) and its Salts: Part 2 - Sodium and Potassium Salts", Polymer Degradation and Stability, vol. 30, 1990, pp. 213-230.
Mcneill et al., "Thermal Stability and Degradation Mechanisms of Poly(Acrylic Acid) and its Salts: Part 3 - Magnesium and Calcium Salts", Polymer Degradation and Stability, vol. 30, 1990, pp. 267-282.
Mierzwa et al., "UV-Hydrogen Peroxide Processes", Advanced Oxidation Processes for Wastewater Treatment, Chapter 2. University of Sao Paulo, Sao Paulo SP Brazil, 2018, 36 pgs.
Prajapat et al., "Intensification of Depolymerization of Polyacrylic Acid Solution Using Different Approaches Based on Ultrasound and Solar Irradiation with Intensification Studies", Ultrasonics Sonochemistry, vol. 32, 2016, pp. 290-299.
Saita et al., "Degradation of Sodium-Polyacrylate in Dilute Aqueous Solution II", Japanese Journal of Applied Physics, vol. 22, No. 8, Aug. 1983, pp. 1310-1314.
Shukla et al., "Ultrasonic Degradation of Poly(acrylic acid)", Journal of Applied Polymer Science, vol. 112, 2009, pp. 991-997.
Shukla et al., "Oxidative and Photooxidative Degradation of Poly(acrylic acid)", Polymer Degradation and Stability, vol. 94. 2009, pp. 1238-1244.
Shukla et al., "Photo, Thermal and Ultrasonic Degradation of EGDMA-Crosslinked Poly(acrylic acid-co-sodium acrylate-co-acrylamide) Superabsorbents", Journal of Applied Polymer Science DOI 10.1002, Dept. of Chemical Engineering, Indian Institute of Science, 2011, pp. 630-639.
U.S. Unpublished U.S. Appl. No. 18/100,151, filed Jan. 23, 2023, to Arsen Simonyan.

DEGRADATION OF SUPERABSORBENT FIBERS VIA OXIDATIVE DEGRADATION

FIELD

The present disclosure generally relates to oxidative degradation of superabsorbent fibers (SAF), especially useful for recycling of post-consumer used SAF. An oxidative water-soluble salt is used to degrade the SAF.

BACKGROUND

Recycling of absorbent-hygiene products (AHPs), such as diapers and pants, feminine hygiene articles, is needed in view of the global challenges regarding sustainability. Many consumer companies strive towards using 100% recycled materials and having zero consumer and manufacturing waste go to landfill. In addition to these goals, successful recycling benefits the environment, stimulates the economy, improves people's health and water quality, and generates energy needed by consumers in developing regions of the world.

A major component in AHPs is typically the superabsorbent polymer (SAP), whereas minor components are adhesives, cellulose fibers, polyethylene, polypropylene, and polyester. An alternative to poly(acrylic acid) based SAP are superabsorbent fibers (SAF). These fibers generally comprise a relatively large amount of comonomers (when compared with superabsorbent polymer particles). Therefore, similar to SAP, there is also a need to recycle SAF used in AHPs.

Recycling of AHPs involves cleaning of the AHPs from the soils accumulated during their use and separating the various components into recycled material streams. More specifically, the recycled SAF material stream can be used in applications less demanding than AHPs (since the recycled SAF has inferior properties compared to virgin SAF) and/or can be converted to essentially linear or branched, non-crosslinked soluble polymers. Then, these soluble polymers can be used as a feed material to various applications. For example, the soluble polymers can be used as-is in applications such as water treatment or corrosion inhibition; or it can be used or further esterified and then used in adhesives, coatings, etc. These applications are part of the effort to recycle SAF into other products by replacing virgin compounds with compounds derived from recycled SAF. In all cases, the objective is to achieve the same properties as virgin materials.

Recycled SAF can be either post-consumer recycled (PCR) SAF or post-industrial recycled (PIR) SAF. No references have been identified to address degradation of SAF not purely based on acrylic acid. Non-limiting examples of processes that produce recycled SAP material streams from recycled AHPs are disclosed and claimed in U.S. Pat. No. 9,095,853 B2, issued on Aug. 4, 2015; and U.S. Pat. No. 9,156,034 B2, issued on Oct. 13, 2015; both assigned to Fater S.p.A, Italy.

Most SAPs are based on poly(acrylic acid) and are crosslinked network materials. Non-limiting examples of procedures used to produce SAPs from acrylic acid and crosslinkers are disclosed in U.S. Pat. No. 8,383,746 B2, issued on Feb. 26, 2013, and assigned to Nippon Shokubai Co., Ltd, Japan; and U.S. Pat. No. 9,822,203 B2, issued on Nov. 21, 2017, and assigned to BASF SE, Germany.

There are many references on attempts to degrade or de-polymerize linear polymers and only a few references on efforts to depolymerize SAPs, which comprise branched PAA cross-linked into a polymer network. The typical forms of energy used in these efforts (either as single forms of energy or in combination) are ultrasound, UV, mechanical (i.e., in the presence of extensional/elongational forces; example: Caruso, M. M., et al., Chem. Rev., 109 (2009), 5755- 5798), thermal (example: McNeill, I. C., and Sadeghi, S. M., Polymer Degrad. Stability, 29 (1990), 233-246), and microwave.

However, there is a need to degrade post-industrial recycled (PIR) SAF (e.g., derived from un-used AHPs which are sorted out during manufacturing and not provided to consumers, or derived from SAF manufacturing processes, e.g., when the SAF did not meet the required performance criteria) and, especially, to degrade post-consumer recycled (PCR) SAF derived from post-consumer AHPs (i.e., after the AHPs have been used). Thus, there is a need to degrade or de-polymerize recycled SAF into soluble, linear or branched, polymers in short time scale, with low energy and power per unit mass of SAF, and at mild conditions, e.g., relatively low temperature and without use of chemicals considered environmentally problematic. The requirement for low energy per unit mass of SAF stems from the fact that the recycling of SAF and its degrading or de-polymerization to soluble polymers is beneficial only if the energy spent during the converting of SAF to soluble polymers is less than that used to make fossil-derived soluble polymers of the same kind. For comparison, making fossil-derived acrylic acid (petro-AA) from propylene for SAP production is about 50 MJ/kg AA. The soluble polymers produced from recycled SAF can then derivatized into materials for other applications such as adhesives, coatings, water treatment, fabric care, etc.

SUMMARY

The disclosure relates to a method for degrading cross-linked superabsorbent fibers (SAF) into soluble polymers, wherein the soluble polymers comprise from 5 weight-% to 75 weight-%, or from 10 weight-% to 75 weight-%, or from 10 weight-% to 70 weight-% of polymerized acrylic acid monomer units based on the total weight of the soluble polymers. As used herein, the term "acrylic acid monomer units" excludes derivatives of acrylic acid monomers, such as esters and amides, and also excludes methacrylic acid monomer units and salts thereof.

The method comprises the steps of:
a) providing SAF,
b) providing an oxidative water-soluble salt comprising at least one cation and at least one anion;
c) providing an aqueous carrier, wherein the aqueous carrier comprises at least one of water and physiological saline;
d) mixing the SAF with the oxidative water-soluble salt and the aqueous carrier; and
e) heating the mixture to a temperature of from 30° C. to 200° C. to degrade the SAF into soluble polymers.

The oxidative water-soluble salt may dissolve in the aqueous carrier in method step d), or, preferably, prior to method step d).

The at least one anion may be selected from the group consisting of: peroxydisulfate, peroxymonosulfate, peroxydicarbonate, peroxydiphosphate, peroxydiborate and mixtures and combinations thereof. Preferably, the at least one anion is a peroxydisulfate.

The soluble polymers are preferably water soluble. The soluble polymers preferably have a solubility in water at 25° C. of more than 5 g of soluble polymer per 100 g water, or more than 15 g of soluble polymer per 100 g water, or from 20 g to 120 g of soluble polymer per 100 g water or from 35 g to 100 g of soluble polymer per 100 g water.

The method may be carried out in the given order, i.e., starting with method step a) and following the method steps onto and including step e). However, the method may also be carried out in different sequence, and/or overlapping (i.e., carrying out two or more steps simultaneously). The skilled person will readily appreciate that not any change in order or simultaneous execution of two or more steps is possible and applicable.

Specifically, steps a) to c) can be carried out in any order or be carried out simultaneously.

The soluble polymers obtained by the method of the present disclosure can be subjected to the NMR Content Method set out below. The NMR Content Method can be used to determine the ratio on a molar basis of protons of functional groups with different NMR signals such as alkene terminal moieties, alkoxy groups (—O—CHR1- with R1 one of the group H, alkyl, aryl, heteroaryl, alkoxy or halogene), aliphatic groups (—CHR1- with R1 one of the group H, alkyl, aryl, heteroaryl or halogene) and/or other 1H-NMR active groups. The NMR Content Method also enables the determination of many monomer units other than acrylic acid monomer units, which are comprised in the soluble polymers, given that the spectra obtained by the NMR Content Method allow the determination of various functional groups due to their different NMR signals.

The disclosure further relates to a method for degrading crosslinked superabsorbent fibers (SAF) into soluble polymers, wherein the soluble polymers have a ratio 3.6:CH of at least 0.04, as determined by the NMR Content Method described herein. The soluble polymers may have a ratio 3.6:CH of at least 0.1, or at least 0.2 as determined by the NMR Content Method described herein. The soluble polymers may have a ratio 3.6:CH of not more than 0.7 as determined by the NMR Content Method described herein. The soluble polymers may have a ratio 3.6:CH of from 0.2 to 0.7, or from 0.3 to 0.7, as determined by the NMR Content Method described herein. The method for degrading crosslinked SAF comprises the steps of:
a) providing SAF,
b) providing an oxidative water-soluble salt comprising at least one cation and at least one anion;
c) providing an aqueous carrier
d) Mixing the SAF with the oxidative water-soluble salt and the aqueous carrier, and
e) heating the mixture to a temperature of from 30° C. to 200° C. to degrade the SAF into soluble polymers.

Still further, the disclosure relates to a method for degrading crosslinked superabsorbent fibers (SAF) into soluble polymers, wherein the soluble polymers have a content "%3.6 ppm" of at least 5%, as determined by the NMR Content Method described herein. The soluble polymers may have a content "%3.6 ppm" of at least 10%, or at least 15%, as determined by the NMR Content Method described herein. The soluble polymers may have a content "%3.6 ppm" of not more than 75%, as determined by the NMR Content Method described herein. The soluble polymers may have a content "%3.6 ppm" of from 15% to 50%, or from 20% to 35%, as determined by the NMR Content Method described herein. The method for degrading crosslinked SAF comprising the steps of:
a) providing SAF,
b) providing an oxidative water-soluble salt comprising at least one cation and at least one anion;
c) providing an aqueous carrier
d) Mixing the SAF with the oxidative water-soluble salt and the aqueous carrier, and
e) heating the mixture to a temperature of from 30° C. to 200° C. to degrade the SAF into soluble polymers.

The soluble polymers may have a content of alkene "% alkene" of not more than 0.31%, as determined by the NMR Content Method described herein.

DETAILED DESCRIPTION

Definitions

Figure 1:
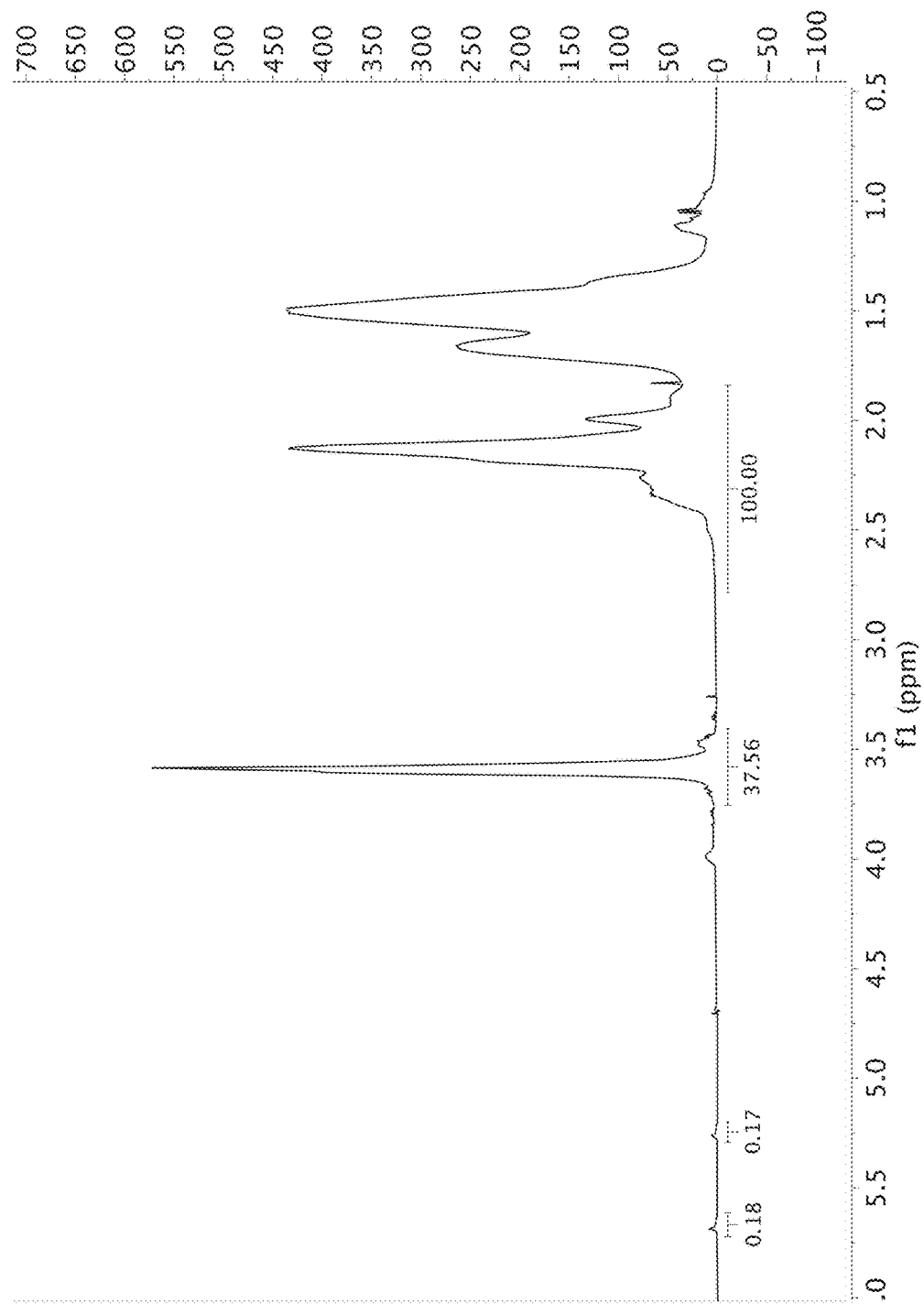
FIG. 1 shows the spectrum of the soluble polymers of Example A2 obtained by the NMR Content test method set out herein.
Figure 2:
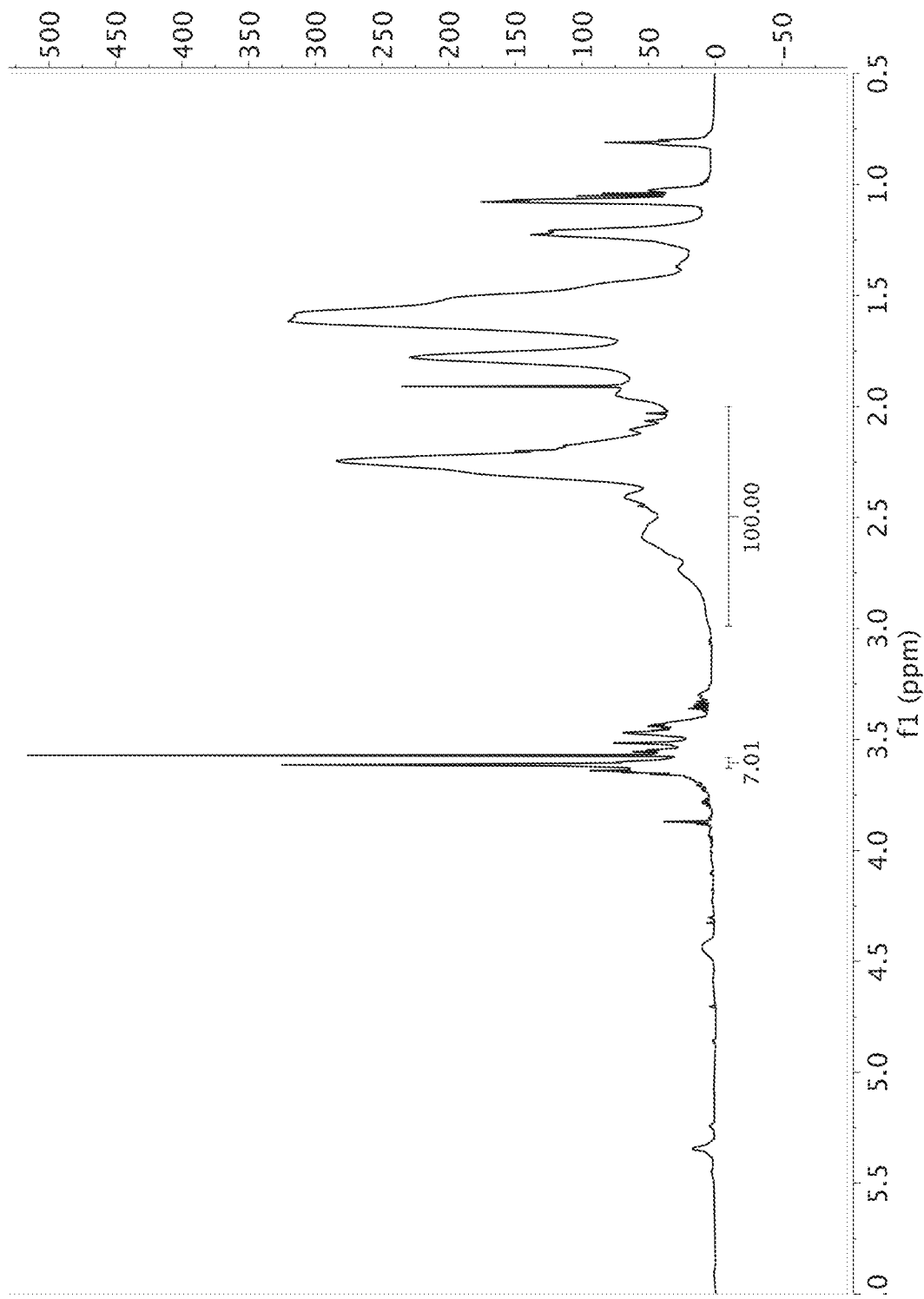
FIG. 2 shows the spectrum of the soluble polymers of Example A25 obtained by the NMR Content test method set out herein.

As used herein, the term "SAF" refers to superabsorbent fibers. The SAF of the present disclosure are capable of absorbing a 0.9 wt % saline solution at 25° C. at least 7 times their dry weight, preferably at least 10 times their dry weight as measured according to the Centrifuge Retention Capacity (CRC) test as described herein. The typical absorption mechanism is osmotic pressure. SAF that absorbs water or aqueous solutions becomes softer and gel-like.

"Superabsorbent fiber" ("SAF") is used herein to refer to superabsorbent polymer material that is in a fibrous form. The superabsorbent fibers have a length and a cross-section. The length is the largest dimension of the fiber when the fiber is or would be laid flat and straight on a surface, such that curves or crimps in the fiber disappear and the fiber becomes an approximately rod-like form. The cross-section is orthogonal to the length. For purposes herein, a fiber is a material that has a largest dimension and smallest dimension, wherein the ratio of largest dimension to smallest dimension is at least 10:1, preferably at least 15:1, even more preferably at least 20:1, i.e., the largest dimension of the superabsorbent fiber (also called the length) is at least 10 times, or at least 15 times, or at least 20 times the smallest dimension of the fiber (also called width). If a superabsorbent fiber has a cross-section that varies along the length of the fiber, the largest dimension of the cross-section (determined along the length of the fiber) is taken as the width of the fiber when calculating the ratio of largest dimension to smallest dimension. As used herein, the term "soluble polymer" refers to a non-crosslinked, and either slightly branched or linear polymer, the polymer comprising from 5 weight-% to 75 weight-% of acrylic acid as the monomeric unit, based on the total weight of the soluble polymers. For the purposes of the present disclosure, for soluble polymers there will be no difference between a polymer and an oligomer. The soluble polymer is the degradation product obtained from degradation of SAF.

As used herein, the term "degradation" refers to the conversion of SAF into soluble polymers via the actions of partial de-polymerization, de-crosslinking, molecular backbone breaking, or any combination of the above actions. The terms degradation, recycling, and conversion are used interchangeably, as long as they refer to the transformation of SAF to soluble polymers. Also, the degradation essentially preserves the carboxylic groups of the SAF and thus the product soluble polymers contains those carboxylic groups. Note that full de-polymerization of SAF should lead to the monomers that were comprised by the SAF.

As used herein, the term "virgin SAF" refers to SAF produced from virgin monomers, which is the feedstock used today to make SAF. Virgin monomers can be produced from either fossil-derived materials or bio-derived materials (non-limiting examples of bio-materials are lactic acid, 3-hydroxypropionic acid, glycerin, bio-propylene, carbon dioxide, and sugar). Virgin SAF does not include any recycled SAF above about 1 wt %.

As used herein, the term "used SAF" refers to SAF which has already been produced industrially and/or used commercially, for example, in a baby diaper, feminine pad, adult incontinence pad, or other articles and/or uses. Used SAF can be post-consumer SAF, post-industrial SAF, or combinations of both. Unless otherwise, SAF refers to either "used SAF" or "virgin SAF".

As used herein, the term "degraded SAF" refers to SAF which has been degraded to soluble polymers. For the purposes of the present disclosure, the terms "degraded SAF" and "soluble polymers" are used interchangeably.

As used herein, the term "recycled SAF" refers to SAF which contains at least 1 wt % degraded SAF (or equivalently, soluble polymers) that has been incorporated into the SAF while the SAF is being produced from acrylic acid and co-monomers using the typical production method. Thus, the recycled SAF is a blend of virgin SAF and at least 1 wt % degraded SAF. As used herein, the term "absorbent-hygiene product", "AHP" refers to devices that absorb and contain body exudates, and, more specifically, refers to devices that are placed against or in proximity to the body of the wearer to absorb and contain the various exudates discharged from the body. Absorbent articles include diapers (e.g., baby diapers and diapers for adult incontinence), absorbent pants, absorbent inserts, feminine care absorbent articles such as sanitary napkins or pantiliners, and the like. The term "exudates" includes, but is not limited to, urine, blood, vaginal discharges, sweat and fecal matter. Preferred AHPs of the present disclosure are diapers, absorbent pants and/or feminine care absorbent articles. AHPs from which post-industrial or post-consumer SAF's, which may be provided for the method of the present disclosure, may be derived may be disposable.

"Disposable" is used in its ordinary sense to mean an article that is disposed or discarded after a limited number of usage over varying lengths of time, for example, less than 20 usages, less than 10 usages, less than 5 usages, or less than 2 usages. If the disposable absorbent article is a diaper, a pant, sanitary napkin, sanitary pad or wet wipe for personal hygiene use, the disposable absorbent article may (and most often is) intended to be disposed after single use.

Degradation Method

Unexpectedly, it has been found that SAF can be degraded into soluble polymers by mixing the SAF with an oxidative water-soluble salt (herein after referred to as "salt"). The salt comprises at least one cation and at least one anion. The SAF and salt are mixed with an aqueous carrier, such as water or physiological saline.

By heating the mixture to a temperature of from 30° C. to 200° C. degradation of the SAF starts, supposedly via radical decomposition caused by decomposition of the oxidative salt into radicals and/or radical ions. The elevated temperature may be at least 35° C., or at least 40° C., or at least 50° C., or at least 60° C., or at least 70° C., or at least 80° C. The elevated temperature may be less than 190° C., or less than 180° C., or less than 150° C. Generally, at elevated temperatures exceeding 200° C., The SAF starts to break down and decay in an uncontrolled manner, which is not desirable.

Without wishing to be bound by theory, it is believed that upon heating the oxidative salt forms radicals or radical ions via decomposition. The radicals or radical ions lead to hydrogen abstraction from the water or the aqueous carrier, resulting in hydroxylradicals, or directly from the SAF. The hydroxylradicals can abstract hydrogen from the SAF. After hydrogen abstraction from the SAF, the polymer network of the SAF can be cleaved due to chain scission. An exemplary mechanism is given in the sketch below. The elevated temperature to which the mixture is heated may be at least 10° C. below the decomposition temperature of the salt (leading to radical or radical ion formation), or the mixture may be heated to an elevated temperature that is at least the decomposition temperature or may be heated to an elevated temperature of at least 10° C. above the decomposition temperature of the salt.

The "decomposition temperature", as used herein, is the 10-hour half-life temperature in water, which, for example, is 69° C. for ammonium persulfate and 60° C. for potassium persulfate.

Thus, the choice of the most optimal temperature range inter alia depends on the choice of the salt, as different salts (specifically different anions) have different decomposition temperatures. The radicals or radical ions, which have been formed, can react with the SAF, e.g., by reacting with an aliphatic C—H group comprised in the polymer chains of the SAF. As a result of this radical reaction, the polymer chain of the SAF is broken-up and a carbon-centered radical is formed at the broken up SAF polymer chain. The reaction may also take place at a carboxyl group of the SAF, also leading to a carbon-centered radical. Still alternatively or in addition, the reaction may take place at a nitrogen atom, which may be comprised by a cross-linker that has been used to initially make the SAF. If the reaction takes place at a nitrogen atom, a nitrogen-centered radical is formed instead of a carbon-centered radical.

Without wishing to be bound by theory, it is believed that the following reaction scheme exemplarily shows the degradation process of the SAF into soluble polymers (i.e., the "decrosslinked polymer products" below):

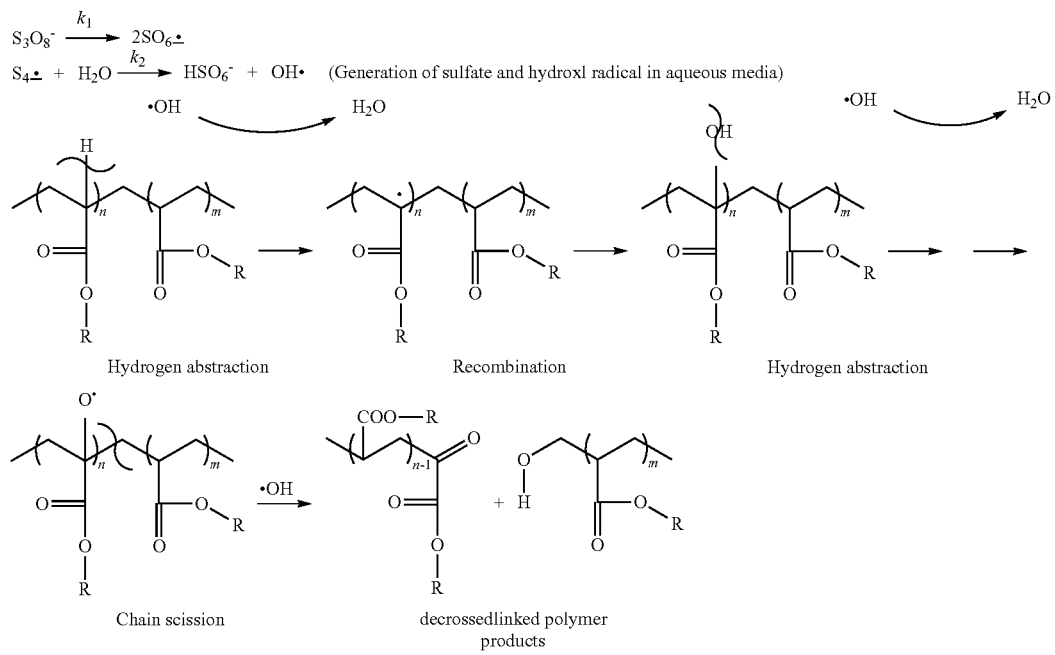

wherein R is H, or alkaline cation, ammonium cation, or crosslinking residue, or other derivatives of the carboxylic group, such as esters, hydroxy esters etc.

The mixture may be maintained at the elevated temperature for from 10 minutes to 10 hours, preferably from 10 minutes to 5 hours, more preferably from 10 minutes to 4 hours. Shorter times are preferred from an economical perspective. Shorter process times may be obtained e.g., by higher salt concentration, higher temperatures (however, below 200° C.) and/or by optimized mixing of SAF and salt. The time during which the mixture is kept at the elevated temperature also depends on the degree of degradation that is desirable (i.e., average molecular weight of the soluble polymers obtained by the process). Generally, once the SAF has been degraded such that no, or only minor amounts of, insoluble SAF are present, indicating that all SAF has been decomposed into soluble polymers, the mixture may no longer need to be maintained at the elevated temperature and the temperature may be decreased to room temperature (25° C.) or below.

The SAF, salt and aqueous carrier may be mixed, e.g., by pre-mixing the salt and the aqueous carrier, such that the salt is, partly or completely, dissolved in the aqueous carrier. The aqueous carrier with the salt dissolved therein can then be mixed with the SAF, such as by spraying the aqueous carrier with dissolved salt onto the SAF. After having sprayed the aqueous carrier with dissolved salt onto the SAF, the mixture may or may not be further mixed, depending e.g., on the amount of SAF, i.e., the thickness of the layer of SAF. If the aqueous carrier with dissolved salt is sprayed onto a thin layer of SAF such that the SAF is appropriately contacted with the aqueous carrier and dissolved salt, further mixing may not be necessary.

The SAF may be mixed with the aqueous carrier and the salt using for example paddle mixers, ploughshare mixers or kneaders or static rotor mixers. Preferably, the mixture of SAF, aqueous carrier and salt are mixed via high-shear mixing.

Alternatively, to pre-mixing the aqueous carrier with the salt to dissolve the salt in the aqueous carrier, it is also possible to provide the aqueous carrier and the salt separately to the SAF.

Importantly, the salt has to be able to dissolve in the aqueous carrier, either after being contacted with the SAF or, preferably, prior to being contacted with the SAF.

The aqueous carrier may be pre-heated to the elevated temperature prior to mixing the aqueous carrier with the salt and SAF. Such preheating may accelerate the degradation method. Alternatively, the aqueous carrier may be pre-heated, however to a temperature below the elevated temperature prior to mixing with the salt and SAF. Still further alternatively, the aqueous carrier may not be pre-heated prior to mixing with the salt and SAF and the heating to the elevated temperature is done after aqueous carrier, salt and SAF are mixed.

If the salt is dissolved in the aqueous carrier prior to mixing with the SAF, the aqueous carrier may be pre-heated to a temperature below the elevated temperature to avoid that the anions prematurely form radicals or radical ions, such that the oxidative salt degrades by self-decomposition and are subsequently no longer available for degradation of the SAF after mixing with the SAF. However, if the salt is dissolved in the aqueous carrier only a short time or immediately before mixing with the SAF, the aqueous carrier may be pre-heated to the elevated temperature before mixing with the SAF. Pre-heating may speed up the time for the salt to dissolve in the aqueous carrier.

Alternatively, or in addition, the SAF may be pre-heated to the elevated temperature or to a temperature below the elevated temperature before mixing with the aqueous carrier and salt. Pre-heated SAF may lead to shorter swelling time of the SAF, thus accelerating the absorption of the aqueous carrier and dissolved salt into the SAF, enabling faster degradation. Faster absorption of the dissolved salt into the SAF may also improve homogenous dispersion of the dissolved salt within the SAF, which may help more homogeneous degradation, thus avoiding that non-degraded pieces of the SAF are left in the mixture.

Still alternatively, the mixture obtained in method step d) may be heated to the elevated temperature only after at least 50 weight-%, or at least 70 weight-%, or at least 90 weight-% or all of the aqueous carrier with salt dissolved therein has been absorbed into the SAF. Some pre-heating to a temperature below the elevated temperature may nevertheless already be done before.

The ratio of salt to SAF may be from 0.001 g of salt to 0.05 g of salt per 1 gram of SAF, or may be from 0.005 g of salt to 0.03 g of salt per 1 gram of SAF, or may be from 0.01 g of salt to 0.03 g of salt per 1 gram of SAF.

The ratio of aqueous carrier to SAF may be from 2 g to 20 g of aqueous carrier per 1 gram of SAF, or may be from 5 g to 15 g of aqueous carrier per 1 gram of SAF.

The SAF may be provided in method step a) dry or swollen to less than 30 g, or less than 20 g, or less than 15 g, or less than 10 g, or less than 5 g of liquid (such as water or physiological saline) per gram of SAF.

The total amount of liquid absorbed into (i.e. comprised in) the SAF in method step e)—including the liquid comprised in the swollen SAF as provided in method step a) (if the SAF is not provided as dry SAF) and the amount aqueous carrier absorbed into and thus comprised by the SAF in method step e), may be from 2 g to 30 g per 1 gram of SAF, or may be from 2 g to 25 g per 1 gram of SAF, or may be from 5 g to 20 g per 1 gram of SAF, or may be from 8 g to 15 g per 1 gram of SAF. As used herein, "dry SAF" means that the SAF has a liquid content of less than 0.20 g per gram of SAF, preferably less than 0.15 g per gram SAF (referred to as "moisture content"). The moisture content of the SAF is measured according to the EDANA Moisture Content Test Method NWSP 230.0.R2 (15).

To ensure that the salt can be used to efficiently degrade the SAF, it is desirable that a significant amount of the aqueous carrier, with the salt being dissolved therein, is absorbed into the SAF in method step d) and e). At least 50 weight-%, or at least 60 weight-%, or at least 75 weight-%, or at least 90 weight-%, or 100 weight-% of the aqueous carrier provided in step c), with the salt dissolved therein, may be absorbed into the SAF. Absorption of the aqueous carrier, with salt dissolved therein, in method step d) and e) means, that the aqueous carrier, with salt dissolved therein, may be absorbed in method step d) only (this will be the case especially when 100 weight-% are absorbed), or predominantly in method step e) (this may be the case if the heating is already starting while the SAF, salt and aqueous carrier are mixed), or a portion of the aqueous carrier with salt dissolved therein is absorbed into the SAF in method step d) while another portion of the aqueous carrier with salt dissolved therein is absorbed into the SAF in method step e).

The SAF provided in method step a) may have a Centrifuge Retention Capacity (CRC) value of from 7 g/g to 45 g/g, or from 10 g/g to 35 g/g, or from 10 g/g to 30 g/g, or from 15 g/g to 30 g/g as measured according to the test method set out below.

If the SAF provided in method step a) is post-consumer recycled SAF, (a sample of) the SAF has to be dried first and then CRC is measured for this sample to determine the CRC of the SAF.

The at least one anion of the salt may be selected from the group consisting of: peroxydisulfate, peroxymonosulfate, peroxydicarbonate, peroxydiphosphate, peroxydiborate, or mixtures thereof.

The at least one cation of the salt is not critical in that typically the cation does not dissociate into radicals. The at least one cation may be chosen to have sufficient solubility in the aqueous carrier, and it should be available at relatively low cost. The at least one cation may be selected from the group consisting of: $Li^+$, $Na^+$, $K^+$, $Rb^+$, $Cs^+$, $NH_4^+$, organically substituted ammonium, $Ca^{2+}$, $Mg^{2+}$, $Sr^{2+}$, $Ba^{2+}$, $Al^{3+}$, transition metal cations of 1+ to 3+ xidation state, or mixtures thereof (e.g., combinations of different salts having different cations). Most preferred are one or more alkaline cations and/or $NH_4^{3O}$ cations.

At least 50% by total weight of the salt, or at least 60% by weight, or at least 70% by weight, or at least 80% by weight, or at least 90% by weight, or 100% by weight may be an alkaline persulfate.

Hydrogen peroxide may be added in the method. Hydrogen peroxide can help to increase the yield per time of soluble polymers, i.e., the rate of degradation. Hydrogen peroxide can also help to decolorize the decomposed contaminants. The hydrogen peroxide may be added to the SAF as a separate aqueous solution, or it may be added in the aqueous carrier, with or without the salt being dissolved in the aqueous carrier, prior to mixing with the SAF. The amount of hydrogen peroxide used in the method of the present disclosure may be from 10 weight-% to 200 weight-% based on weight of the salt, or may be from 20 weight-% to 100 weight-% by weight of the salt, or may be from 30 weigh t% to 80 weight-% by weight of the salt.

Method step e) may be carried out at a pH of 3-7. Typically, no further, special measures are required to obtain a pH in this range. Persulfate radicals, for example, as less stable at pH above 7.

Additives may be used in the method of the present disclosure. For example, small molecular weight alcohols, such as methanol, ethanol, propanol, isopropanol, butanol, ethylene glycol, propylene glycol, glycerin or mixtures thereof may be added to the aqueous carrier provided in method step c) or added to the mixture of method step d). These additives may support the initial wettability of the SAF with aqueous carrier and salt dissolved therein. They may also improve the stability of the aqueous carrier against bacterial contamination. Other additives such as anti-bacterial additives may also be added. The total amount of additives may not be more than 10 weight-%, or not more than 8 weight-%, or not more than 5 weight-%, or not more than 3 weight-% based on the weight of the aqueous carrier. In another embodiment, the degradation mixture of method step d) is free of additives, and free of small molecular weight alcohols, such as methanol, ethanol, propanol, isopropanol, butanol, ethylene glycol, propylene glycol, glycerin, or mixtures thereof.

The method of the present disclosure can be carried out in a continuous process or as a batch process. Generally, continuous processes are often preferred from a commercial/cost perspective. In a continuous process, the SAF may, for example, be provided in a continuous stream, e.g., on a carrier belt or the like, and aqueous carrier and salt are mixed with the SAF, e.g., by spraying the aqueous carrier and salt (and, optionally, the hydrogen peroxide) onto the SAF. The mixture of SAF, salt and aqueous carrier can be transferred onto a belt after method step d) (e.g., after the aqueous carrier with salt dissolved therein has been partly or fully absorbed into the SAF) and heated in a continuous or batch fashion.

Alternatively, the aqueous carrier can be provided in a batch vessel or similar container (with salt dissolved therein prior to or after providing the aqueous carrier into the vessel. SAF can then be added in the vessel, which already is filled with the aqueous carrier and dissolved salt. and the SAF may be left to absorb the aqueous carrier and salt dissolved therein and, simultaneously or subsequently, the mixture can be heated to the elevated temperature.

For SAF, especially if provided as dry SAF, air tends to be "trapped" between the fibers, i.e., in the interstices between the SAF as they absorb liquid and swell. Hence, the swollen SAF tend to "float" in liquid. As the SAF are degraded, the solubilized polymers may sink down in the vessel, where it can (continuously) be removed. To avoid that non-degraded or partly degraded SAF are removed together with the soluble polymers (as some SAF may sink in the vessel), a mesh or the like may be installed within the vessel to hinder the non- or fully degraded SAF from sinking further to the bottom of the vessel, as they will be captured in the mesh until they are more fully degraded and able to pass through the mesh.

Alternatively, the mixture of SAF, salt and aqueous carrier may also be stirred such that the swollen SAF sink towards the ground of a vessel and the soluble polymers, i.e., the product of the method, can be removed from the upper part of the vessel.

The obtained solution with the polymers solubilized therein, may be transferred, e.g., via pumps, to a different vessel, to a pipe, or any other appropriate device, for any posttreatment that may be desired for the solution. Possible posttreatments are filtration, desalination, or numerous other treatments.

The energy consumption of the degradation process inter alia depends on the elevated temperatures. The higher the elevated temperature, the higher the energy consumption per time (i.e., a short process time at higher elevated temperature may overall require less energy than a relatively lower elevated temperature with relatively longer process time). For comparison, the energy consumption is about 3.5 MJ/kg dry SAP for an elevated temperature of about 100° C. for a batch process in an insulated vessel, i.e., a process where the heating to the elevated temperature is done only once.

The method of the present disclosure may be carried out under increased temperature. However, if the temperature is above the boiling point of the aqueous carrier, it is preferable that evaporation of the aqueous carrier is avoided. This can be done by carrying out the method in a (closed, confined) space wherein the evaporation of the aqueous carrier can be efficiently avoided. Alternatively, or in addition, it is possible to carry out the method under increased pressure (i.e., above ambient pressure) to reduce or avoid boiling of the aqueous carrier, as the boiling point increases with increased pressure.

SAF Provided in Method Step A)

The SAF provided in the method can be virgin SAF, post-consumer recycled SAF (=PCR SAF), post-industrial recycled SAF (=PIR SAF), or a combination of those materials. "Post-consumer SAF" and "post-consumer recycled SAF" (=PCR SAF) are used herein interchangeably and, as used herein, refer to SAF which has been comprised by an AHP and the AHP has been used by a consumer (e.g., worn by an incontinent user). After use, the AHP is recycled, and the PCR SAF is isolated from the AHP. However, it is not necessary that the SAF is purified such that no other components of the post-consumer AHP are comprised by the post-consumer SAF which is provided for the method of the present disclosure.

"Post-industrial SAF" and "post-industrial recycled SAF" (=PIR SAF) are used herein interchangeably and, as used herein, refer to SAF which may or may not have been comprised by an AHP. The PIR SAF has not been previously used, e.g., it was not comprised by an AHP which has been used by a consumer. Instead, the PIR SAF may be derived from AHPs which have been sorted out during production, e.g., because they are defective. The PIR SAF may also have been sorted out during SAF production, e.g., because they do not meet the required performance targets (such as capacity, whiteness, or the like). Thus, for the latter scenario, the PIR SAF was not previously comprised by an AHP.

The typical properties of SAF are mechanical properties, swelling capacity, and centrifuge retention capacity (CRC) measured according to the test method set out below.

The SAF includes from more than 25 weight-% to less than 95 weight-% of other co-monomers (i.e., other than acrylic acid). Suitable co-monomers are monomeric groups e.g., comprised of/consisting of methyl acrylate, methyl methacrylate, ethyl (meth) acrylate 2-ethyl hexyl (meth) acrylate, or polyacrylamides, polyvinyl alcohol, ethylene maleic anhydride copolymers, polyvinyl ethers, hydroxypropylcellulose, polyvinlmorpholinone, and polymers and copolymers of vinyl sulfonic acid, polyvinyl amines, polyallylamines, polyvinylpyrridine, and the like. Other suitable polymers in SAF include hydrolyzed acrylonitrile grafted starch, acrylic acid grafted starch, and isobutylene maleic anhydride copolymers and mixtures thereof. The SAF are crosslinked to render the material substantially water insoluble. Preferred monomers are methyl (meth) acrylate, and/or monomers comprising a hydroxylic group, e.g., hydroxyalkyl (meth) acrylates, e.g., hydroxyethyl methacrylate, tripropyleneglycol mono acrylate, 5 glyceryl monoacrylate etc. The SAF can comprise/consist of polymers formed of two kinds of monomers (including acrylic acid) or more preferably of three or more kinds of monomers.

The SAF may have a sodium level as amount of Na in wt % greater than about 8 wt %, or a sodium level as amount of Na in wt % of from 10 wt % to 20 wt %, or from 15 wt % to 18 wt %. In yet another embodiment, the SAF has or a sodium level as amount of Na in wt % below 12 wt % (for the avoidance of doubt, weight-%, wt % and wt-% are used herein interchangeably). Also, or alternatively, the SAF may have a potassium level as amount of K in wt % greater than about 13.5 wt %, or a potassium level as amount of K in wt % of from 17wt % to 34 wt %, or from 25.5 wt % to 30.6 wt %. The SAF may have a potassium level as amount of K in wt % below 20.4 wt %. The Na content as well as the K content can for example by measured using the Inductively Coupled Plasma (ICP) analytical technique, as it is well known to those skilled in the art.

Alternatively, the SAF may have a ammonium level as amount of $NH_4^+$ in wt % of greater than about 6.3 wt %, or a ammonium level as amount of $NH_4^+$ in wt % of from 7.8 wt % to 15.7 wt %, or from 11.7 wt % to 14.1 wt %. The SAF may have an ammonium level as amount of $NH_4^+$ in wt % of below 9.4 wt %.

The SAF provided to the method of the present disclosure may be in dry form or may be partly swollen with water, saline, or urine (e.g., urine in PCR SAF). Hence, the SAF may be swollen to from 0.05 g/g to 20 g/g with water, saline or urine, preferably to from 0.05 g/g to 15 g/g, more preferably to from 0.10 g/g to 10 g/g, more preferably to from 0.20 g/g to 5 g/g, and even more preferably to from 0.50 g/g to 2 g/g. Completely dry (i.e. 0 g/g of water, saline or urine) may be less advantageous for the method of the present disclosure, because it takes longer for completely dry SAF to absorb the aqueous carrier with the salt dissolved therein. On the other hand, SAF which is excessively swollen (or even fully swollen) when provided to the method, may also lead to an increase in time until the salt dissolved in the aqueous carrier is absorbed into the SAF.

The SAFs provided to the method may have an absorbent capacity CRC (measured as Centrifuge Retention Capacity "CRC" according to the test method set out below).

The SAF provided in method step a) may be i) in the form of loose fibers or may be ii) in the form of a nonwoven web, or may be a combination of i) and ii). If the SAF are in the form of a nonwoven web, the nonwoven web may consist of SAF or may comprise SAF. A nonwoven web comprising SAF and provided in method step a) may comprise at least 50 weight-% of SAF based on the total weight of the nonwoven web, or may comprise at least 60 weight-%, or at least 70 weight-%, or at least 80 weight-%, or at least 90 weight-% of SAF based on the total weight of the nonwoven web.

The nonwoven web may further comprise further components such as synthetic fibers, natural fibers (e.g., cellulose fibers), or combinations thereof. Synthetic fibers that may be comprised by such nonwoven webs may be polyolefin fibers (e.g., polyethylene, polypropylene, or combinations thereof), or PET fibers, or combinations of polyolefin and PET fibers.

The non-SAF components of the nonwoven web may be removed prior to subjecting the SAF to the method of the present disclosure, however, this does not need to be the case. Instead, the nonwoven web comprising the SAF may be subjected to the method of the present disclosure (as complete nonwoven web, cut, shred or milled) together with the non-SAF components of the nonwoven web.

Prior to or during the method, the nonwoven web may be cut into pieces or may be milled or otherwise shred to make the SAF more accessible to the oxidated water-soluble salt. Alternatively, the nonwoven web is subjected "as is" to the method.

The amount of aqueous carrier provided in method step c) may be such that the SAF provided in step a) are able to swell to at least 20%, or at least 30%, 50%, or at least 60% or at least 70%, or at least 80% of their CRC upon absorption of all aqueous carrier provided. If the SAF not provided dry but pre-swollen (see further details below), the less aqueous carrier is required to obtain the desired degree of SAF load, i.e., the desired CRC.

Upon absorption of liquid, the polymer chains within the polymer network of the SAF start to disentangle. Such disentanglement will make the polymer network easier accessible for the radicals or radical ions formed from the salt. Hence, degradation is improved. If the amount of aqueous carrier provided in step c) does not enable the SAF to swell to at least 20% of their CRC upon absorption of the aqueous carrier, the polymer chains within the polymer network of the SAF may not be able to sufficiently disentangle, making degradation slower or overall less effective.

For the degradation method of the present disclosure, the use of post-consumer SAF may be beneficial over the use of virgin SAF: The polymer chains in the polymer network of a previously swollen and then at least partly red-dried SAF have already been disentangled. Re-swelling and thus anewed disentanglement is believed to be faster versus swelling of virgin SAF.

If post-consumer SAF is provided in partly swollen form for the method of the present disclosure, it is also advantageous that there is no need to completely dry the SAF for use in the method, given that drying of post-consumer SAF is time- and energy consuming. However, post-consumer SAF may be sterilized prior to providing it to the method.

If post-consumer SAF or post-industrial SAF are isolated from AHPs to be provided for the method of the present disclosure, the SAF does not necessarily need to be purified such that no other components of the AHPs are present. The SAF may be contaminated with other components of the AHP, such as synthetic fibrous materials or films (e.g., fibers, sheets, films, and fibrous layers), cellulose fibers, adhesives, inks, dyes, surfactants etc. The amount of these contaminants may not be more than 20% by weight of the mixture of SAF and contaminants, or may not be more than 15% by weight, or not more than 10% by weight, or not more than 5% by weight, or not more than 2% by weight, or not more than 1% by weight.

If the post-consumer SAF is still swollen, e.g., with urine or other liquid, this urine or other liquid comprised by the SAF is not taken into consideration when calculating the amount of contaminants by weight of the mixture of SAF and contaminants.

If the SAF is provided as dry SAF, the average fiber size of the post-industrial or post-consumer SAF may optionally be reduced, e.g., by milling, grinding or other suitable means. This could result in a reduced fiber length of not more than about 50% of the length of the un-reduced fiber length, or from about 10% to about 70% of the length of the un-reduced fiber length.

If the SAF is provided in pre-swollen form, e.g., as post-consumer SAF, which was not or only partly dried after recycling, the SAF may be subjected to comminution to increase the surface area of the SAF, which may enable faster absorption of the aqueous carrier with the salt dissolved therein. Such faster absorption may, in turn, lead to faster degradation of the SAF. Comminution may, for example, be done by wet grinding, dry milling or cutting.

Smaller fiber sizes can help fast and homogeneous absorption of the dissolved salt into the SAF, leading to faster and more complete degradation of the SAF. Furthermore, smaller fiber sizes, especially for entangled fibers such as in nonwoven, may help mixing of SAF with the salt and the aqueous carrier.

Optional method step f) of separating the soluble polymers in the aqueous solution from other compounds and components in the mixture:

Once the SAF has been decomposed into soluble polymers, the soluble polymers may be separated from the mixture of (possibly remaining non-decomposed) SAF, salt, aqueous carrier, and optional further components (such as hydrogen peroxide and/or smaller molecular weight alcohols). The mixture may still comprise a certain amount of non-decomposed SAF, which may be present in the mixture as solid, insoluble component.

The soluble polymers can be extracted from the mixture via a number of processes. Non-limiting examples of these processes are water evaporation, filtration of the soluble polymers, water extraction, etc. Also, the salts can be removed via any desalination technique known to those skilled in the art. Non-limiting examples of desalination processes are membrane processes (e.g., reverse osmosis, forward osmosis, electrodialysis reversal (EDR), nanofiltration, etc.), freezing desalination, solar desalination, geothermal desalination, ion exchange, wave powered desalination, etc. The same techniques can generally also be applied to remove other small molecular weight compounds in the mixture, e.g., other typical compounds of the post-consumer AHPs such as adhesives, inks, dyes, surfactants, and degradation products of these compounds.

For example, filtration may be used to eliminate the solid compounds and components from the mixture, i.e., for method step d) of separating the soluble polymers in the aqueous solution from other compounds and components in the mixture obtained by step c). Solid compounds and components may be remaining insoluble SAF and other components of post-consumer AHPs, such as synthetic fibrous materials or films (fibers, sheets/films/fibrous layers) and cellulose. Notably, polyolefins (e.g., polypropylene, polyethylene) comprised by the other components of post-consumer AHPs, such as the synthetic fibrous materials or films, are not soluble or swellable in the aqueous carrier. They may only react with the salt to a negligible extent, i.e., the polyolefins are not or only insignificantly degraded by the method of the present disclosure. The same apply for PET, which may also be comprised by the synthetic fibrous materials or films. Thus, those materials will remain as solid components in the mixture and may be filtered out.

PEG, another typical component in post-consumer AHPs, e.g., comprised in surfactants, is degraded by the method of the present disclosure. However, the PEG is typically degraded into molecules of relatively small molecular weight, which is significantly smaller than the molecular weight of the soluble polymers obtained by SAF degradation. Hence, the small molecular weight reaction products of PEG can be separated from the soluble polymers, e.g., by the techniques described above.

Alternatively, or in addition, the mixture of soluble polymers, (possibly remaining parts of) SAF, salt and aqueous carrier, which may comprise compounds of post-consumer AHPs, may also be mixed in a co-solvent in which the soluble polymers are not soluble such that the soluble polymers will precipitate to isolate it from the mixture. Prior to such mixing in a co-solvent, solid compounds in the mixture may be removed by filtration.

Soluble Polymers Obtained by the Method

The soluble polymers obtained by the degradation method of the present disclosure may have varying molecular weight. The soluble polymers may or may not comprise oligomers. Preferably, the soluble polymers does not comprise oligomers, i.e., soluble polymers relate to polymers only. The average molecular weight Mw of the soluble polymers may be up to 10 MDa, or up to 5 MDa. The average molecular weight Mw of the soluble polymers may be at least 10 kDa, or at least 20 kDa, or from 30 kDa to 1 MDa. The soluble polymers may be linear or branched. However, the soluble polymers are not cross-linked and hence they are soluble, preferably water soluble.

The soluble polymers obtained by the method can be used or derivatized into materials for other applications such as adhesives, coatings, water treatment, etc. In one embodiment, the soluble polymers, either as is or derivatized, is used in an adhesive. In yet another embodiment, the soluble polymers, either as is or derivatized, is used in fabric care applications. In even yet another embodiment, the soluble polymers, either as is or derivatized, is used in water treatment applications.

Test Methods

NMR Content Method

The NMR Content Method is used to determine the ratio on a molar basis of functional groups with different NMR signals such as alkene terminal moieties, alkoxy groups (—O—$CHR_1$- with $R_1$ one of the group H, alkyl, aryl, heteroaryl, alkoxy or halogene), aliphatic groups (—$CHR_1$- with $R_1$ one of the group H, alkyl, aryl, heteroaryl or halogene) and/or other $^1$H-NMR active groups.

In this method, proton NMR spectroscopy is used to analyze a sample of soluble material in deuterated water, and peaks of different $^1$H-NMR domains are integrated, and ratioed to determine the mole percent of protons of the functional groups or different $^1$H-NMR domains, respectively.

The soluble polymer is dried in a vacuum oven (Heraeus Vacutherm type, Thermo Scientific™) at 40° C. and pressure between 10 and 50 mbar for 3 hours (=step 8 in the procedure below). Any small molecular weight alcohol, ester or ether is removed from the soluble polymer.

A flowable solution less than 10% by weight sample dissolved in $D_2O$ and pH adjusted to 5.5-6.5 is prepared. The solution is transferred to an NMR glass grade tube and placed in the sample holder (bore) of a proton NMR instrument. An example of a suitable instrument is a Bruker NMR device with 400 MHZ field strength. Instruments of other makes and other field strengths, even including "low-field" instruments operating as low as 60 MHz, can successfully be used to perform this method. A noesy-presat sequence is used to acquire the data and suppress the residual water signal. One of skill will be familiar with appropriate choice of other specific data collection parameters. Appropriate parameters used with the exemplary 400-MHz Bruker instrument above are: acquisition time (FID length) of 4.1 s, relaxation time of 8 s, 90-degree pulse widths, spectral width of 20 ppm, 64 k points in the FID, and 64 repetition scans used. In the Fourier transform step, exponential apodization is used with 0.3-Hz line broadening, and the spectrum is phased into absorption. A spline baseline correction is used to ensure flat baseline on either side of peaks to be integrated.

Figure 3:
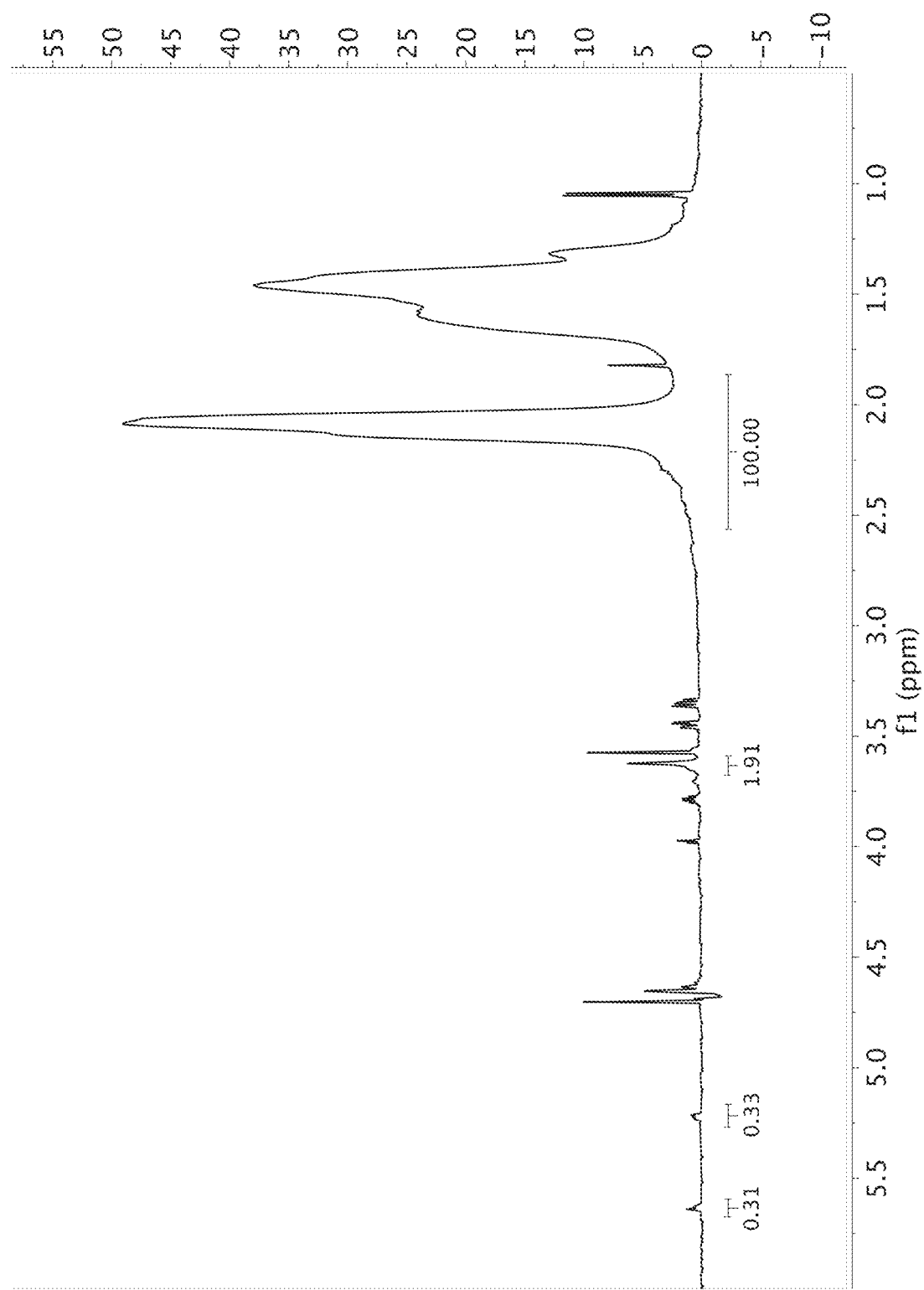
FIG. 3 shows the spectrum of the soluble polymers of Comparative Example C1 obtained by the NMR Content test method set out herein.
Figure 4:
FIG. 4 shows photos of Example A2 before and after degradation, i.e., the photo on the left shows the dry sample in the beaker (in step 3 of the experimental procedure described below) and the photo on the right shows the sample after step 6 of the experimental procedure is completed. (The number "32681b" on the beaker indicates the internal lab code of the sample, which corresponds to Example A2 herein.)
Figure 5:
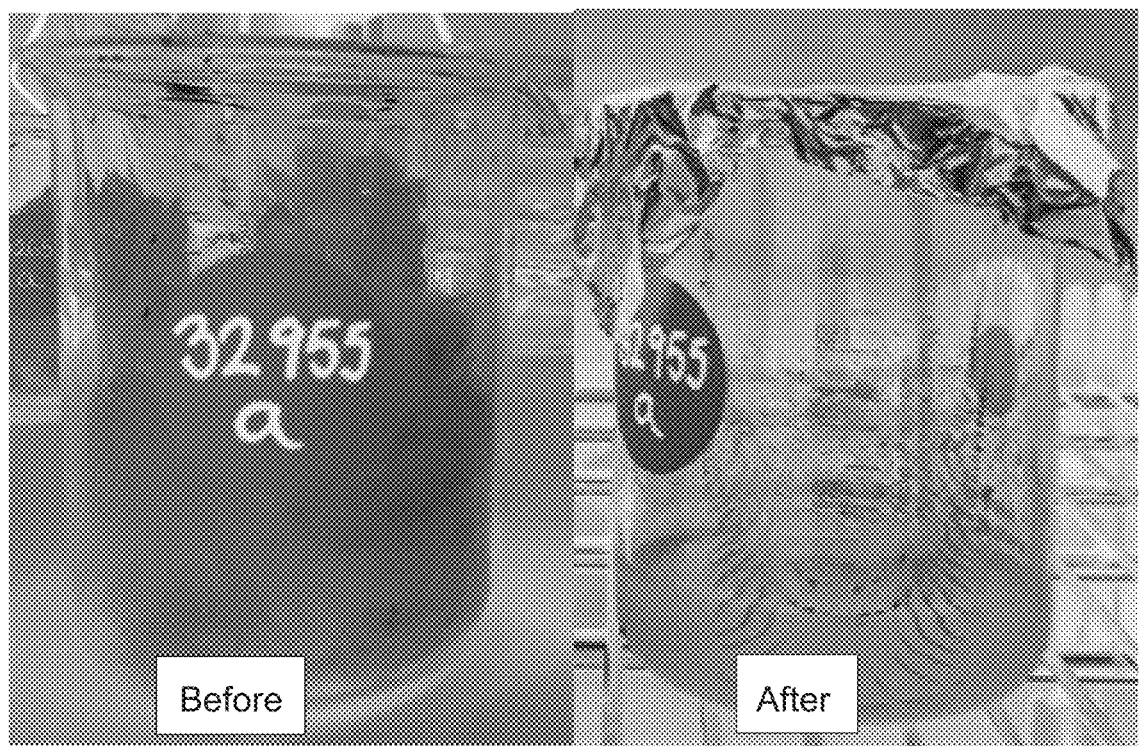
FIG. 5 shows photos of Example A18 before and after degradation, i.e., the photo on the left shows the dry sample in the beaker (in step 3 of the experimental procedure described below) and the photo on the right shows the samples after step 6 of the experimental procedure is completed. (The number "32955a" on the beaker indicates the internal lab code of the sample, which corresponds to Example A18 herein.)

The following peak domains are typically used for the content determination and integrated:
1) One of two terminal alkene protons at chemical shifts in the range of appr. 5-6 ppm, typically one terminal alkene proton at appr. 5.35 ppm +/−0.5ppm. (To confirm the identify of such proton peak as terminal alkene proton a standard edited $^1$H-$^{13}$C HSQC sequence can be used (following e.g., W. Willker, D. Leibfritz, R. Kerssebaum & W. Bermel, Magn. Reson. Chem. 31, 287-292 (1993)) to determine that the alkene signals seen in the 1D-1H spectrum are both attached to the same methylene (secondary) carbon (—$CH_2$).). The resulting integral is called "integral_alkene".
2) alkoxy protons at chemical shifts in the range of appr. 3.2-3.8 ppm, typically at appr. 3.6 ppm. The resulting integral is called "integral_3.6". In case more than one signal appears at appr. 3.6 ppm, i.e., in the range of appr. 3.2-3.8 ppm, the signal with the largest integral is chosen to get "integral_3.6" (as shown e.g., in FIG. 3).
3) methylene protons of aliphatic CH-groups, typically at ca. 1.5 ppm and 2.1 ppm, or at ca. 1.8 ppm. The resulting integral is called "integral_CH".
4) other aliphatic groups at chemical shifts in the range of appr. 1.0-2.6 ppm.
5) other groups or peaks of different $^1$H-NMR domains can be analyzed as well, provided that they
   a) are separated signals,
   b) have peak maxima are at a distance of at least 0.5 ppm.
6) The peaks in the NMR spectrum corresponding to class 1), 2), 3) and/or 4) are identified and, if present, integrated. If no such peak is present, this reported as no measurable content of class 1), 2), 3) or 4), respectively. As known by the person skilled in the art, the integration ranges from baseline (start of signal) to baseline (end of signal) (see e.g., the signal at approximately 3.6 ppm in FIG. 1), or in case of broad and/or complex the boarders of integration result from the start of the next neighboring signal (see e.g., the CH-signal, i.e., the -relatively small- peak at approximately 1.55 ppm in FIG. 1).

The ratio "ratio 3.6:CH" is calculated via the following formula:

ratio 3.6:CH=integral_3.6/integral_CH ratio 3.6:CH is a unitless number an represents the ratio of protons at ca. 3.6 ppm The content of alkene "% alkene" is calculated via the following formula:

% alkene=[integral_alkene/(integral_alkene+integral_3.6+integral_CH)]*100%

The content of methylene "% CH" is calculated via the following formula:

% CH=[integral_CH/(integral_alkene+integral_3.6+integral_CH)]*100%

The content of protons at about 3.6 ppm (such as alkoxy protons) "%3.6 ppm" is calculated via the following formula:

%3.6=[integral_3.6/(integral_alkene+integral_3.6+integral_CH)]*100%

The ratio "ratio 3.6:CH" is reported to the nearest 0.001.
The content of alkene, methylene and protons at about 3.6 ppm are reported in % to the nearest 0.01%.

Gel Permeation Chromatography with Multi-Angle Light Scattering and Refractive Index Detection (GPC-MALS/RI) for Polymer Molecular Weight Distribution Measurement Gel Permeation Chromatography (GPC) with Multi-Angle Light Scattering (MALS) and Refractive Index (RI) Detection (GPC-MALS/RI) permits the measurement of absolute weight average molecular weight Mw of a polymer without the need for column calibration methods or standards. The GPC system allows molecules to be separated as a function of their molecular size. MALS and RI allow information to be obtained on the number average (Mn) and weight average (Mw) molecular weight.

The Mw distribution of soluble polymers, especially water soluble polymers such as PAA polymers, is typically measured by using a Liquid Chromatography system consisting generally of a pump system, an autosampler (e.g., Agilent 1260 Infinity pump system with OpenLab Chemstation software, Agilent Technology, Santa Clara, CA, USA), and a column set of appropriate dimensions (e.g., Waters ultrahydrogel guard column, 6 mm ID×40 mm length, two ultrahydrogel linear columns, 7.8 mm ID×300 mm length, Waters Corporation of Milford, Mass., USA) which is typically operated at 40° C.

The column set comprises one or typically more subsequently connected columns with varying pore-sizes graded for different molecular weight polymers and columns are generally selected such to provide resolution of wide and relevant molecular weights range.

Commonly, the mobile phase is for example 0.1M sodium nitrate in water containing 0.02% sodium azide and is pumped at a flow rate of about 1 mL/min, isocratically. A multiangle light scattering (MALS) detector (e.g., DAWN®) and a differential refractive index (RI) detector (e.g., Wyatt Technology of Santa Barbara, Calif., USA) controlled by respective software packages, e.g., Wyatt Astra®, are used.

A sample is typically prepared by dissolving polymer materials, such as soluble polymers, in the mobile phase at about 1 mg per ml and by mixing the solution for overnight hydration at room temperature. The sample is filtered through a membrane filter (e.g., a 0.8 μm Versapor filter, PALL, Life Sciences, NY, USA) into the LC autosampler vial using a syringe before the GPC analysis.

A dn/dc (differential change of refractive index with concentration) value is typically measured on the polymer materials of interest and used for the number average molecular weight and weight average molecular weight determination by the respective detector software.

Centrifuge Retention Capacity (CRC) Test Method

Capacity of the superabsorbent fibers is determined according to the Centrifuge Retention Capacity (CRC) test method as set out in EDANA NWSP 241.0.R2(19). In deviation from EDANA NWSP 241.0.R2(19) the sampling (chapter 8 in EDANA NWSP 241.0.R2(19)) for the superabsorbent fibers, superabsorbent nonwovens and/or the superabsorbent core is as following:

The superabsorbent fibers, superabsorbent nonwovens and/or the superabsorbent core are cut into pieces with approximately 5 mm as largest dimension. The cutting can e.g., be done manually with scissors. Care is taken that the fibrous structure (the core, the nonwoven or the bulk of fibers) is not majorly compressed before or during the cutting process. This ensures sufficient void space between the superabsorbent fibers, so they can be predominately wetted by the swelling medium at the entire surface area.

Further deviations from or additions to EDANA NWSP 241.0.R2(19) in the procedure (chapter 9.1-9.5 in EDANA NWSP 241.0.R2(19)) for the superabsorbent fibers, superabsorbent nonwovens and/or the superabsorbent core are as following:

The sample for the measurement is taken carefully, e.g. with a lab pincet, to put it into the teabag. With a lab pincet, the fibers are carefully distributed in the teabag to avoid lumps and fiber lumps, if any, are carefully opened.

When sealing the teabag, care is taken that no material of the superabsorbent fibers, superabsorbent nonwovens and/or the superabsorbent core is in the area of the seal. This ensures a complete and sufficiently strong sealing of the teabag.

All other items of the test method are executed as set out in EDANA NWSP 241.0.R2(19).

EXAMPLES

Experimental Procedure

Several samples of SAF and on sample (=Comparative Example C1) of SAP were subjected to the method of the present disclosure.

The deionized water is prepared using a lab water purification system (e.g., Milli-Q® from Millipore Corporation). The electrical conductivity of the deionized water was measured with a lab conductometer COND 70 INSTRUMENT without CELL, #50010522, equipped with Cell VPT51-01 C=0.1 from XS Instruments or via LF 320/Set, #300243 equipped with TetraCon® 325 from WTW. The electrical conductivity of the water was <160 μS/cm at 0° C. Similar equipment for measuring electrical conductivity can be used accordingly.

Unless stated otherwise, the experimental procedure was performed in a climate conditioned room at standard conditions of 23° C.±2° C. temperature and 45%±10% relative humidity.

Procedure:

Abbreviations given in quotation marks indicate the name of the respective column in Tables 2 and 3 below.

A stock of different concentrations of potassium persulfate (KPS) was prepared by completely dissolving by stirring the amount of KPS (dry salt) "m(KPS)" in grams (Sigma-Aldrich, >=99.0% purity, inventory number 216224-500G) into the amount of deionized water "m(H$_2$O)" in grams (i.e., the aqueous carrier in a 1 L plastic bottle (made of HDPE, Nalgene™)). Complete dissolution of the KPS salt is observed when no visible salt crystals remain in the solution. (Amounts of KPS and deionized water are listed in Table 2).

The amount of 30 weight-% hydrogen peroxide solution "m(HPO)" in grams (±0.01 g) (a.k.a. Perhydrol, Sigma-Aldrich, inventory number 216763-500ML) was transferred with one-way pipette (e.g., graduated transfer pipette/1 ml/large B /inventory number Z1350011-500EA from Sigma Aldrich) into the stock solution of potassium persulfate prepared according to step 1). The resulting stock solution of the total amount "m(stock solution)" in grams has the concentration of KPS "w_KPS" in weight-% and the hydrogen peroxide level "w_HPO" in ppm. (listed in Table 2).

For examples, an amount of dry sample (SAF or SAP, respectively) of weight "M0" (±0.01 g) was measured on a balance into a glass beaker of 250 ml volume (e.g., Pyrex lab glassware).

The amount "Ms0" of aqueous carrier (i.e., freshly prepared stock solution) in grams, as prepared in step 1) and 2), was added to the dry sample in the glass beaker. The amount "Ms0" for each example is given in Table 2. Immediately after addition of the aqueous solution to the dry sample, the mixture was manually stirred and kneaded for about 60 s via a spoon (e.g., standard spoon, ca. 180 mm length, FxE 55 mm×38 mm, e.g., art. #3482, type 2 standard spoon from Bochem Instrumente GmbH) to improve the wetting and uniform swelling of all superabsorbent material of the sample.

The glass beaker with the samples as prepared in step 4) were then covered with Aluminum foil and left at room temperature for not more than 15 min before heating in the oven (see step 5).

A circulation oven (e.g., Modell FED 720 from Binder GmbH, Germany) was pre-heated to the temperature "Temperature T" in ° C. as listed in Table 2. When the temperature was reached, the respective beakers with the samples as prepared in step 5) were placed in the oven and a chronometer is started.

After the time "Time" in hours (listed in Table 2) is passed, the respective samples in the glass beakers were taken out and left to cool down at room temperature for about 30 min.

The Sample is filtered through a metal sieve with the mesh of 500 µm (diameter 100 mm from Retsch GmbH, Germany) that is placed on the top of a glass beaker of about 800 ml volume. The sample in the sieve is carefully mixed with a spoon (e.g., standard soup spoon) to improve the filtration rate. Filtration results in a clear solution without any visible solid or gel-like residues. The net weight of the clear solution in grams is recorded as "Ms" (listed in Table 2). After filtration the clear solution is transferred into a plastic bottle (e.g., 1 L plastic bottle (made of HDPE, Nalgene™)).

An aliquot part of the clear solution with mass "m_a" (listed in Table 2) in grams is measured via a 5 ml plastic syringe into a pre-weighed 20 ml glass vial of empty weight (without snap-on cap) of m_sc (not listed in the Tables below) in grams. The 20 ml vial with the clear solution is then put into a vacuum oven (Heraeus Vacutherm type, Thermo Scientific™) at 40° C. and pressure between 10 and 50 mbar for 3 hours to ensure substantial evaporation of the water. The weight of the dry residue is measured and recorded as "Mp" (listed in Table 2) in grams. "Mp" is used to calculate the yield "Y" (listed in Table 3) in weight-% of the degradation via the formula:

ti $Y = 100\% \cdot [(Mp \times Ms)/(m\_a \times M0)]$

The yield Y is reported in weight-% to the nearest 0.1 wt %.

The solid content of the clear solution "S.C." (listed in Table 3) in weight-% is calculated via the following formula:

$$S.C. = [Mp/m\_a] \cdot 100\%$$

The solid content S.C is reported in weight-% to the nearest 0.1 wt %.

The details and results are given in Table 2 and 3. Information about the SAF and the SAP that were degraded is provided in Table 1.

In deviation from the procedure above, for Comparative Example C2, 0.1 molar NaOH aqueous solution was used as aqueous carrier without any oxidative water-soluble salt.

TABLE 1

SAF and SAP materials

| SAF/SAP | Description | CRC [g/g] | Type |
|---|---|---|---|
| SAF 1 | Superabsorbent Fibers SAF ™ 112/52/10 (supplied by Technical Absorbent Ltd.) | 27.2 | Fibers |
| SAF 2 | Superabsorbent Fibers SAF ™ 102/52/10 (supplied by Technical Absorbent Ltd.) | 26.7 | Fibers |
| SAF 3 | SAF 2, heat treated for 5 min | 13.5* | Fibers |
| SAF 4 | SAF 2, heat treated for 8 min | 9.6* | Fibers |
| SAF 5 | Superabsorbent Fibers SAF ™ 112/52/10 (supplied by Technical Absorbent Ltd.) | 25.5 | Fibers |
| SAF 6 | Superabsorbent Nonwoven, made via needlefelt process from SAF 5, basis weight of the nonwoven was 300 gsm, Prior to degradation, the nonwoven was milled using a lab mill (IKA Tube Mill 100 control with 100 ml mill insert MT 100.50) at 5000 rpm two times for 2.5 min each | 25.5** | Nonwoven consisting of fibers |
| SAF 7 | LANSEAL ®, absorbent fibers (supplied by Toyobo Chemicals Europe GmbH) | 10.6 | Fibers |
| SAP 1 (Comparative Example) | Granular poly(acrylic acid) based SAP | 27.6 | Granular SAP |

*CRC determined after heat treatment of SAF 2.
**same as SAF 5.

Heat Treatment of SAF 3 and SAF 4:
Superabsorbent fibers of SAF 2 are placed into Teflon coated baking trays (e.g., Kaiser 7509960, 41×31×10 cm) to form a homogeneous lofty, non-compressed layer of appr. 3-5 cm thickness. The tray with the superabsorbent fibers is placed in a pre-heated oven at 220° C. (e.g., Binder APT.Line FD 240) and kept for the respective heating time.
SAF 3: Heating time 5 minutes
SAF 4: Heating time 8 minutes After the heating time has passed, the tray with the superabsorbent fibers is taken from the oven and left at r.t. on a lab bench for about 10-20 min to cool down. The fibers are taken from the tray and stored in closed zip-lock bags (e.g., LDPE-Druckverschlussbeutel, 300×200 mm, #129-0306P from
VWR International). The fibers are only taken out of the closed zip-lock bags immediately prior to subjecting them to the procedure described above (steps 1 to 10).

TABLE 1

Examples

| Example | SAF | M0 [g] | m(KPS) [g] | m(HPO) [g] | m(H₂O) [g] | w_KPS [wt %] | w_HPO [ppm] | m(stock solution) [g] | Ms0 [g] | Temperature T [° C.] | Time [hours] | Ms [g] | m_a [g] | Mp [g] |
|---|---|---|---|---|---|---|---|---|---|---|---|---|---|---|
| A1 | SAF 1 | 5.00 | 1.00 | 0 | 990.0 | 0.1 | 0 | 1000 | 50 | 100 | 6 | 10.68 | 3.04 | 0.334 |
| A2 | SAF 1 | 5.00 | 1.00 | 1.665 | 988.3 | 0.1 | 500 | 1000 | 50 | 100 | 6 | 20.99 | 3.01 | 0.341 |
| A3 | SAF 2 | 5.00 | 2.00 | 0 | 980.0 | 0.2 | 0 | 1000 | 50 | 100 | 6 | 14.50 | 3.03 | 0.306 |
| A4 | SAF 2 | 5.00 | 2.00 | 1.665 | 978.3 | 0.2 | 500 | 1000 | 50 | 100 | 9 | 33.98 | 3.05 | 0.365 |
| A5 | SAF 2 | 5.00 | 2.00 | 1.665 | 978.3 | 0.2 | 500 | 1000 | 100 | 100 | 9 | 93.30 | 3.02 | 0.153 |
| A6 | SAF 2 | 5.00 | 1.00 | 0 | 990.0 | 0.1 | 0 | 1000 | 50 | 100 | 9 | 20.50 | 3.03 | 0.275 |
| A7 | SAF 2 | 5.00 | 1.00 | 0 | 990.0 | 0.1 | 0 | 1000 | 100 | 100 | 9 | 77.00 | 3.01 | 0.169 |
| A8 | SAF 3 | 5.00 | 2.00 | 0 | 980.0 | 0.2 | 0 | 1000 | 50 | 100 | 6 | 14.80 | 3.01 | 0.310 |
| A9 | SAF 3 | 5.00 | 2.00 | 1.665 | 978.3 | 0.2 | 500 | 1000 | 50 | 100 | 9 | 36.40 | 3.00 | 0.330 |
| A10 | SAF 3 | 5.00 | 2.00 | 1.665 | 978.3 | 0.2 | 500 | 1000 | 100 | 100 | 9 | 89.50 | 3.00 | 0.159 |
| A11 | SAF 3 | 5.00 | 1.00 | 0 | 990.0 | 0.1 | 0 | 1000 | 50 | 100 | 9 | 19.50 | 3.02 | 0.244 |
| A12 | SAF 3 | 5.00 | 1.00 | 0 | 990.0 | 0.1 | 0 | 1000 | 100 | 100 | 9 | 75.50 | 3.04 | 0.169 |
| A13 | SAF 4 | 5.00 | 2.00 | 0 | 980.0 | 0.2 | 0 | 1000 | 50 | 100 | 6 | 6.00 | 2.58 | 0.265 |
| A14 | SAF 4 | 5.00 | 2.00 | 1.665 | 978.3 | 0.2 | 500 | 1000 | 50 | 100 | 9 | 24.50 | 3.00 | 0.382 |
| A15 | SAF 4 | 5.00 | 2.00 | 1.665 | 978.3 | 0.2 | 500 | 1000 | 100 | 100 | 9 | 91.30 | 3.00 | 0.162 |
| A16 | SAF 4 | 5.00 | 1.00 | 0 | 990.0 | 0.1 | 0 | 1000 | 50 | 100 | 9 | 9.00 | 2.95 | 0.174 |
| A17 | SAF 4 | 5.00 | 1.00 | 0 | 990.0 | 0.1 | 0 | 1000 | 100 | 100 | 9 | 72.75 | 3.04 | 0.168 |
| A18 | SAF 5 | 5.00 | 1.00 | 0 | 990.0 | 0.1 | 0 | 1000 | 50 | 100 | 6 | 13.03 | 3.01 | 0.393 |
| A19 | SAF 5 | 5.00 | 1.00 | 1.665 | 988.3 | 0.1 | 500 | 1000 | 50 | 100 | 6 | 14.20 | 3.00 | 0.346 |
| A20 | SAF 6 | 5.00 | 2.00 | 0 | 980.0 | 0.2 | 0 | 1000 | 50 | 100 | 6 | 27.00 | 3.06 | 0.287 |
| A21 | SAF 6 | 5.00 | 2.00 | 1.665 | 978.3 | 0.2 | 500 | 1000 | 50 | 100 | 6 | 26.64 | 3.02 | 0.270 |
| A22 | SAF 6 | 5.00 | 2.00 | 1.665 | 978.3 | 0.2 | 500 | 1000 | 50 | 100 | 9 | 42.00 | 3.00 | 0.305 |
| A23 | SAF 6 | 5.00 | 2.00 | 1.665 | 978.3 | 0.2 | 500 | 1000 | 100 | 100 | 9 | 93.70 | 3.00 | 0.1605 |
| A24 | SAF 6 | 5.00 | 1.00 | 0 | 990.0 | 0.1 | 0 | 1000 | 50 | 100 | 9 | 20.80 | 3.05 | 0.3269 |
| A25 | SAF 7 | 5.00 | 4.00 | 1.665 | 958.3 | 0.4 | 500 | 1000 | 150 | 100 | 10 | 112.60 | 2.97 | 0.0429 |
| A26 | SAF 7 | 5.00 | 4.00 | 1.665 | 958.3 | 0.4 | 500 | 1000 | 250 | 100 | 10 | 220.00 | 3.01 | 0.0283 |
| C1 | Comparative SAP | 400 | 4.00 | 0 | 3996.0 | 0.1 | 0 | 4000 | 4000 | 100 | 9 | 26460. | 3.25 | 0.3587 |
| C2 | SAF2 | 5.00 | 0 | 0 | **** | 0 | 0 | **** | 150 | 100 | 20 | n.a.*** | n.a.*** | n.a.*** |

***no degradation of fibers observed.
**** aqueous carrier: 0.1 molar aqueous NaOH solution.

TABLE 3

Data of Examples

| Example | SAF | S.C. [wt %] | Y [wt %] | Mw (kDa) | ratio 3.6:CH | % alkene [%] | % CH [%] | %3.6 ppm [%] |
|---|---|---|---|---|---|---|---|---|
| A1 | SAF 1 | 11.0 | 23.5 | 334 | 0.348 | 0.09 | 74.13 | 25.77 |
| A2 | SAF 1 | 11.3 | 47.5 | 224 | 0.352 | 0.12 | 72.61 | 27.27 |
| A3 | SAF 2 | 10.1 | 29.3 | 348 | 0.347 | 0.07 | 74.16 | 25.77 |
| A4 | SAF 2 | 12.0 | 81.5 | 143 | 0.333 | 0.18 | 74.86 | 24.96 |
| A5 | SAF 2 | 5.1 | 94.5 | 44 | 0.338 | 0.28 | 74.53 | 25.19 |
| A6 | SAF 2 | 9.1 | 37.2 | 263 | 0.339 | 0.11 | 74.60 | 25.29 |
| A7 | SAF 2 | 5.6 | 86.3 | 113 | 0.344 | 0.18 | 74.28 | 25.54 |
| A8 | SAF 3 | 10.3 | 30.5 | 348 | 0.350 | 0.11 | 74.01 | 25.87 |
| A9 | SAF 3 | 11.0 | 79.9 | 145 | 0.334 | 0.19 | 74.83 | 24.97 |
| A10 | SAF 3 | 5.3 | 94.7 | 36 | 0.334 | 0.26 | 74.77 | 24.96 |
| A11 | SAF 3 | 8.1 | 31.5 | 269 | 0.338 | 0.13 | 74.63 | 25.23 |
| A12 | SAF 3 | 5.6 | 83.9 | 115 | 0.342 | 0.20 | 74.35 | 25.45 |
| A13 | SAF 4 | 10.2 | 12.3 | 367 | 0.349 | 0.07 | 74.09 | 25.84 |
| A14 | SAF 4 | 12.7 | 62.3 | 199 | 0.332 | 0.14 | 74.95 | 24.90 |
| A15 | SAF 4 | 5.4 | 98.4 | 35 | 0.341 | 0.31 | 74.33 | 25.36 |
| A16 | SAF 4 | 5.9 | 10.7 | 296 | 0.332 | 0.11 | 74.97 | 24.92 |
| A17 | SAF 4 | 5.5 | 80.5 | 187 | 0.337 | 0.14 | 74.71 | 25.15 |

TABLE 3-continued

Data of Examples

| Example | SAF | S.C. [wt %] | Y [wt %] | Mw (kDa) | ratio 3.6:CH | % alkene [%] | % CH [%] | %3.6 ppm [%] |
|---|---|---|---|---|---|---|---|---|
| A18 | SAF 5 | 13.1 | 34.0 | 340 | 0.347 | 0.08 | 74.18 | 25.74 |
| A19 | SAF 5 | 11.5 | 32.8 | 250 | 0.347 | 0.07 | 74.18 | 25.76 |
| A20 | SAF 6 | 9.4 | 50.7 | 256 | 0.347 | 0.11 | 74.15 | 25.74 |
| A21 | SAF 6 | 8.9 | 47.6 | 410 | 0.342 | 0.10 | 74.45 | 25.45 |
| A22 | SAF 6 | 10.2 | 85.3 | 117 | 0.337 | 0.20 | 74.67 | 25.13 |
| A23 | SAF 6 | 5.0 | 94.1 | 31 | 0.330 | 0.25 | 75.02 | 24.73 |
| A24 | SAF 6 | 10.7 | 44.7 | 317 | 0.338 | 0.11 | 74.65 | 25.24 |
| A25 | SAF 7 | 1.4 | 31.6 | 327 | 0.070 | 0 | 93.45 | 6.55 |
| A26 | SAF 7 | 0.9 | 41.1 | 710 | 0.058 | 0 | 94.49 | 5.51 |
| C1 | Comparative SAP | 11.1 | 73.1 | 285 | 0.019 | 0.32 | 97.81 | 1.87 |
| C2 | SAF 2 | n.a.*** | n.a.*** | n.a.*** | n.a.*** | n.a.*** | n.a.*** | n.a.*** |

***no degradation of fibers observed.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, comprising any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for degrading crosslinked superabsorbent fibers (SAF) into soluble polymers, wherein the soluble polymers comprise from 5 weight-% to 75 weight-%, of polymerized acrylic acid monomer units based on the total weight of the soluble polymers, the method comprising the steps of:
    a) providing SAF,
    b) providing an oxidative water-soluble salt comprising at least one cation and at least one anion,
    c) providing an aqueous carrier,
    d) mixing the SAF with the oxidative water-soluble salt and the aqueous carrier, and
    e) heating the mixture to a temperature of from 30° C. to 200° C. to degrade the SAF into soluble polymers.

2. The method of claim 1, wherein the oxidative water-soluble salt is dissolved in the aqueous carrier prior to method step d) or in method step d).

3. The method of claim 2, wherein at least 50 weight-% of the aqueous carrier, with the oxidative water-soluble salt dissolved therein, is absorbed into the SAF in method step d) and/or e).

4. The method of claim 3, wherein the SAF has absorbed a total amount of liquid of from 5 g to 25 g per 1 gram of SAF, wherein the total amount of liquid is the sum of the amount of liquid comprised in the SAF provided in step a) and the amount of aqueous carrier absorbed in method step d) and e).

5. The method of claim 1, wherein the amount of aqueous carrier provided in method step c) enables the SAF provided in step a) to swell to at least 20% of the SAF's CRC upon absorption of all aqueous carrier provided, wherein the CRC is measured according to the test method set out herein.

6. The method of claim 1, wherein the at least one anion is selected from the group consisting of: peroxydisulfate, peroxymonosulfate, peroxydicarbonate, peroxydiphosphate, peroxydiborate and mixtures and combinations thereof.

7. The method of claim 1, wherein the cation selected from the group consisting of: $Li^+$, $Na^+$, $K^+$, $Rb^+$, $Cs^+$, $NH_4^+$, organically substituted ammonium, $Ca^{2+}$, $Mg^{2+}$, $Sr^{2+}$, $Ba^{2+}$, $Al^{3+}$, transition metal cations of 1+ to 3+ oxidation state, and mixtures and combinations thereof.

8. The method of claim 1, wherein the oxidative water-soluble salt comprises at least 50 weight-% of alkaline persulfate by total weight of the oxidative water-soluble salt.

9. The method of claim 1, wherein the method further comprises the step of adding hydrogen peroxide.

10. The method of claim 1, wherein the ratio of oxidative water-soluble salt to SAF is from 0.001 g to 0.05 g of oxidative salt per 1 gram of SAF.

11. The method of claim 1, wherein the ratio of aqueous carrier to SAF is from 2 g to 20 g of aqueous carrier per 1 gram of dry SAF.

12. The method of claim 1, wherein the SAF provided in step a) is dry SAF or is swollen to from 0.05 g to 10 g per 1 gram of dry SAF.

13. The method of claim 1, wherein the SAF provided in step a) has a CRC value of 10 g/g to 50 g/g as measured according to the test method set out herein.

14. The method of claim 1, wherein the mixed SAF, oxidative water-soluble salt and the aqueous carrier are maintained at the temperature of method step e) for 10 minutes to 3 hours.

15. The method of claim 1, wherein the temperature to which the mixture is heated in step e) is at least 10° C. below the decomposition temperature of the oxidative water-soluble salt.

16. The method of claim 1, wherein additives are added in method step d) and wherein the total amount of additives is not more than 10 weight-% based on the weight of the aqueous carrier.

17. The method of claim 1, wherein the soluble polymers are soluble in water.

18. A method for degrading crosslinked superabsorbent fibers (SAF) into soluble polymers, wherein the soluble polymers have a ratio 3.6:CH of at least 0.04, as determined by the NMR Content Method described herein, the method for degrading crosslinked SAF comprising the steps of:
providing SAF,
providing an oxidative water-soluble salt comprising at least one cation and at least one anion,
providing an aqueous carrier,
mixing the SAF with the oxidative water-soluble salt and the aqueous carrier, and
heating the mixture to a temperature of from 30° C. to 200° C. to degrade the SAF into soluble polymers.

19. A method for degrading crosslinked superabsorbent fibers (SAF) into soluble polymers, wherein the soluble polymers have a content "%3.6 ppm" of at least 5%, as determined by the NMR Content Method described herein, the method for degrading crosslinked SAF comprising the steps of:
providing SAF,
providing an oxidative water-soluble salt comprising at least one cation and at least one anion,
providing an aqueous carrier,
mixing the SAF with the oxidative water-soluble salt and the aqueous carrier, and
heating the mixture to a temperature of from 30° C. to 200° C. to degrade the SAF into soluble polymers.

20. The method of claim 19, wherein the soluble polymers have a content of alkene "% alkene" of not more than 0.31%, as determined by the NMR Content Method described herein.

* * * * *